(12) United States Patent
Chen et al.

(10) Patent No.: US 7,080,933 B2
(45) Date of Patent: Jul. 25, 2006

(54) BLU AND MODULE USING THE BLU

(75) Inventors: Wen-Ho Chen, Hsin Chu (TW); Hui Yen Huang, Hsin Chu (TW); King Chang Chang, Hsin Chu (TW); Chia-Feng Lin, Tai Chung (TW)

(73) Assignee: J. S. Technology Co., Ltd., Hsin Chu (TW)

( * ) Notice: Subject to any disclaimer, the term of this patent is extended or adjusted under 35 U.S.C. 154(b) by 75 days.

(21) Appl. No.: 10/855,517

(22) Filed: May 28, 2004

(65) Prior Publication Data

US 2005/0276075 A1 Dec. 15, 2005

(51) Int. Cl.
*F21V 7/04* (2006.01)
*F21V 7/20* (2006.01)

(52) U.S. Cl. ........................ 362/616; 362/607; 362/218

(58) Field of Classification Search ................ 362/561, 362/606, 615–617, 330, 612, 607, 218
See application file for complete search history.

(56) References Cited

U.S. PATENT DOCUMENTS 4,729,068 A * 3/1988 Ohe ........................... 362/615
5,617,251 A * 4/1997 Ohta et al. ................... 359/599
5,808,708 A * 9/1998 Oyama et al. ................. 349/65
6,540,377 B1 * 4/2003 Ota et al. ..................... 362/231
6,709,122 B1 * 3/2004 Adachi et al. ................. 362/27
6,883,950 B1 * 4/2005 Adachi et al. ............... 362/555
6,964,497 B1 * 11/2005 Greiner ....................... 362/241
6,989,873 B1 * 1/2006 Hua-Nan et al. .............. 349/64

* cited by examiner

*Primary Examiner*—Renee Luebke
*Assistant Examiner*—David Makiya
(74) *Attorney, Agent, or Firm*—Rosenberg, Klein & Lee

(57) ABSTRACT

A BLU module has a plurality of BLUs assembled together. Each of the BLUs includes a light guide, a light source structure adjacent to the light guide, and a heat conduction member contacting the light source structure. The light guide has a light-emitting surface arranged on a top thereof and a bottom surface opposing the light-emitting surface, the light-emitting surface being larger than the bottom surface so that that light guide defines a first cavity formed therebetween. The light source structure is received in the first cavity. The light guide in two adjacent BLUs of the module defines a second cavity opposite the first cavity for receiving an adjacent heat conduction member of a prior adjacent light guide. The module is provided with a variable size with the BLUs assembled together to meet requirements.

17 Claims, 4 Drawing Sheets

BLU AND MODULE USING THE BLU

BACKGROUND OF THE INVENTION

1. Field of the Invention

The present invention relates to a BLU (Back Light Unit) module, and particularly relates to a thin-type BLU module with effective heat dissipation and high uniform luminance.

2. Background of the Invention

A BLU is a device providing a backlight source that is usually placed behind a panel of an information, a communication or a consumer product, such as an LCD (Liquid Crystal Display), a film scanner, an optical lantern, and so on. In particular, the BLU is widely used in LCDs, which is thin, lightweight, and portable, and occupies a certain degree of the display market share. As LCD technology develops, the tendency is towards large and cheap units, and the BLU needs to be light weight, thin, power conservative, brightly lit, and cheap, simultaneously. For success in the competitive market, new designs of the BLU, new technologies of the injection molding process, and the like should be constructive issues to the industry.

Generally speaking, a conventional BLU can be classified into two categories in terms of locations of light sources therein, such as edge lighting and bottom lighting. In the first category, an edge lighting BLU 1a, referring to FIG. 1, is suitable in small-size liquid crystal module 9a and light guide 10a, which are usually under 14 inches. There are two major types of light sources 11a in the edge lighting BLU, whether single sided or double sided, a CCFL (Cold Cathode Fluorescent Lamp) and an LED (Light Emitting Diode), which is thinner, lighter, and more power conservative than that with the CCFL and usually used in a notebook. The edge lighting BLU 1a further includes a diffusion sheet 13a and a prism sheet 14a arranged over the light guide 10a for increasing the uniformity and the symmetry thereof, and a reflection sheet 12a disposed beneath the light guide 10a for raising the luminance thereof. In the second category, a bottom lighting BLU 2a, referring to FIG. 2, is suitable in a large LCD that is usually over 17 inches, in which size the edge lighting BLU 1a is unwelcome because it make the unit heavy, dark and power consumptive. Thus, the bottom lighting BLU 2a is provided, and light sources 21a consisting of a plurality of CCFLs are distributed behind a display screen for direct view via a reflection sheet 22a under the light sources 21a and a light guide (or a diffusion sheet) 20a over the light sources 21a. The bottom lighting BLU 2a provides a lightweight, bright and large LCD, with a large view angle with a simple structure and high lighting efficiency, and usually used in a monitor. A prism sheet 23 is applicable over the light guide (or the diffusion sheet) 20a for a larger view angle. However, this conventional unit has several drawbacks. First, the large light guide (or diffusion sheet) 20a is extremely difficult to manufacture in the injection molding process and requires and expensive mold. Second, the CCFLs of the light sources 21a use a lot of power and make the shape of the lamp configuration visible, which in turn causes a non-homogeneous illumination thereof. Third, the CCFLs of the light sources 21a make heat dissipation very troublesome, and addition of a heat sink module sacrifices the thinness and weight thereof. Fourth, the CCFLs of the light sources 21a include noxious chemicals, like mercury, and should be replaced by another type of lighting.

Hence, an improvement over the prior art is required to overcome the disadvantages thereof.

SUMMARY OF INVENTION

The primary object of the invention is therefore to specify a BLU and a module using the BLU, in which the module uses a plurality of BLUs assembled together for the various sizes thereof to meet requirements, to avoid the costs of developing large molds and to increase the yield rate thereof.

The secondary object of the invention is therefore to specify a BLU and a module using the BLU, in which the module uses a plurality of BLUs assembled together with high vacuum-occupied efficiency to be thin and lightweight for success in the competitive market.

The third object of the invention is therefore to specify a BLU and a module using the BLU; the module using a plurality of BLUs assembled together provides a high heat-dissipation efficiency to prevent heat problems from reducing the service life and heat-dissipation efficiency thereof.

The fourth object of the invention is therefore to specify a BLU and a module using the BLU; the module using a plurality of BLUs assembled together provides bright and uniform illumination thereof.

The fifth object of the invention is therefore to specify a BLU and a module using the BLU; the module using a plurality of BLUs assembled together provides a light source including LEDs that meet environmental requirements.

According to the invention, the objects are achieved by a BLU and a module using the BLU. The module includes a plurality of BLUs assembled together; each of the BLUs includes a light guide, a light source structure adjacent to the light guide, and a heat conduction member contacting the light source structure. The light guide has a light-emitting surface arranged on a top thereof and a bottom surface opposing the light-emitting surface, the light-emitting surface being larger than the bottom surface so that that light guide defines a first cavity formed therebetween. The light source structure is received in the first cavity. The light guide in two adjacent BLUs of the module defines a second cavity opposite the first cavity for receiving an adjacent heat conduction member of a prior adjacent light guide. The module is variable in size, with the BLUs assembled together to meet requirements.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
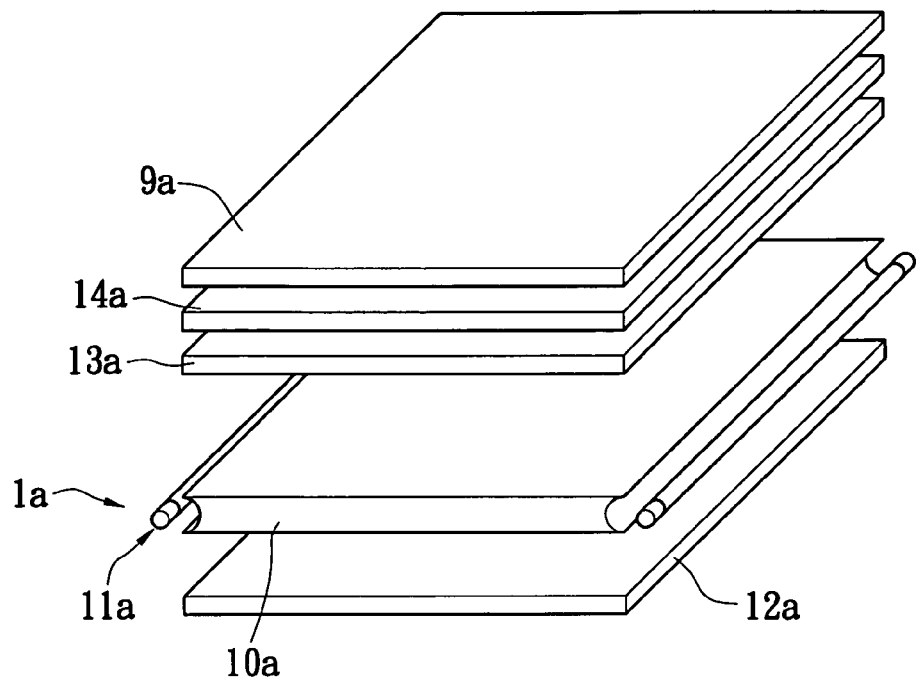
FIG. 1 is a side view according to a conventional edge lighting BLU.
Figure 2:
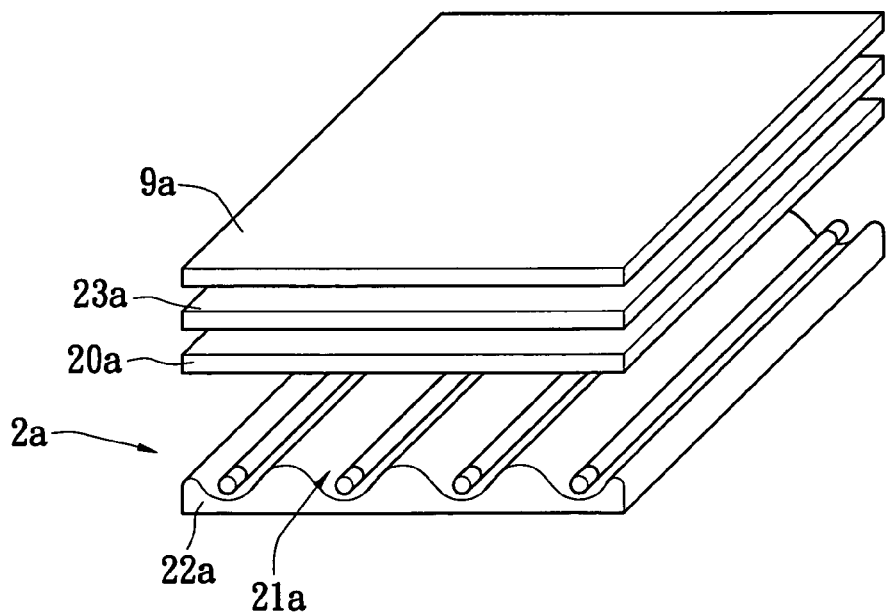
FIG. 2 is a side view according to a conventional bottom lighting BLU.
Figure 3:
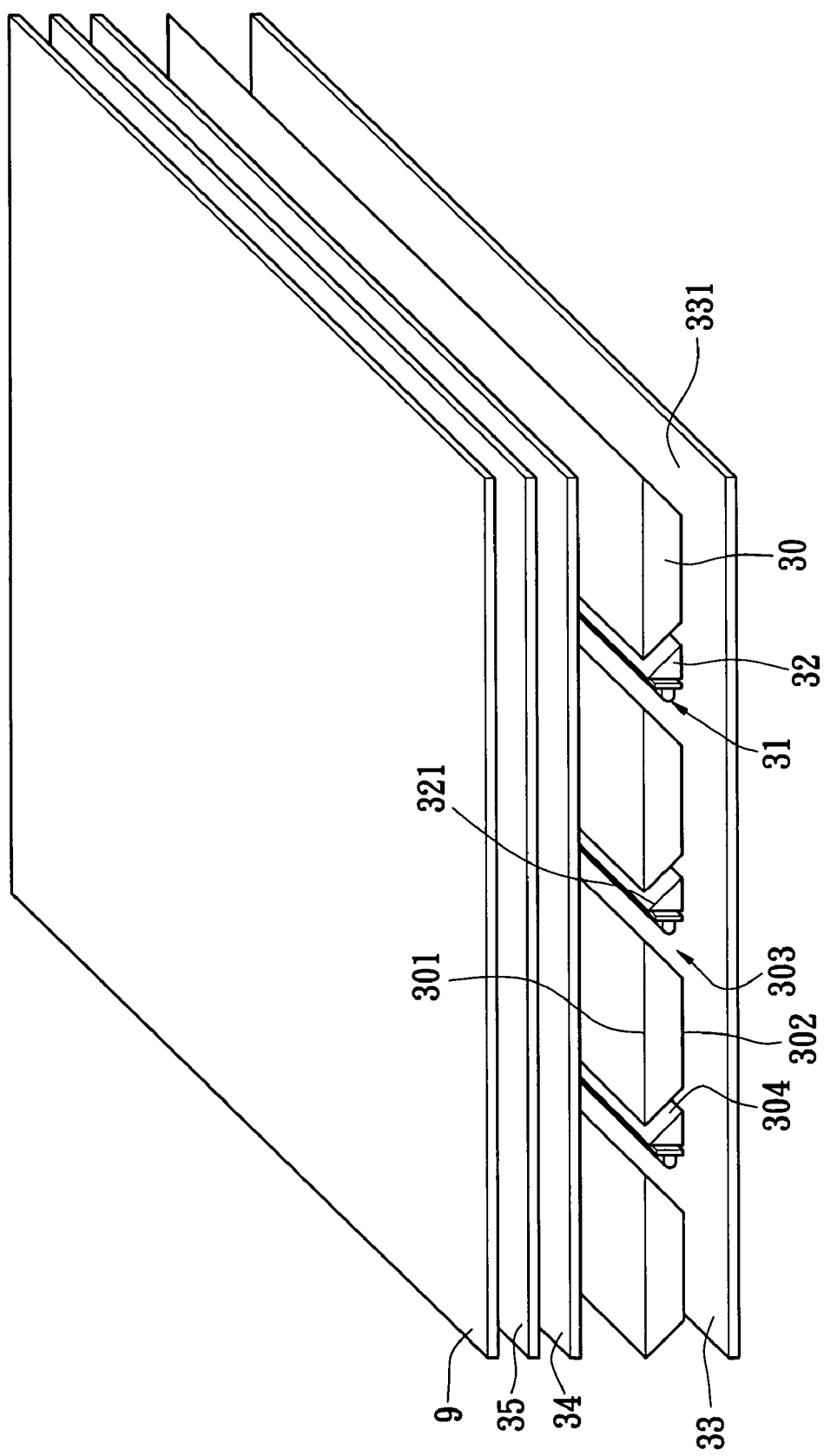
FIG. 3 is a side view of a preferred embodiment of a BLU module according to the present invention.

Referring to FIG. 3, the present invention provides a BLU and a module using the BLU. The module includes a plurality of BLUs assembled together. Each of the BLUs includes a light guide 30, a light source structure 31 adjacent to a side of the light guide 31, and a heat conduction member 32 contacting the light source structure 31. The light guide 30 is wedge-like, and has a light-emitting surface 301 arranged on a top thereof and a bottom surface 302 opposing the light-emitting surface 301. The light-emitting surface 301 is larger than the bottom surface 302, so that that light guide 30 defines a first cavity 303 formed therebetween. The light source structure 31 is received in the first cavity 303. The heat conduction member 32 and the light guide 30 are arranged on opposing sides of the light source structure 31. The heat conduction member 32 has a high thermal-conductivity coefficient thereof for dissipating heat from the light source structure 31 to a heat dissipation plate 33 for heat sinking. The heat conduction member 32 is made of an aluminum alloy material or a copper alloy material. In addition, the light guide 30 in two adjacent BLUs of the module defines a second cavity 304 opposite the first cavity 303 for receiving an adjacent heat conduction member 32 of a prior adjacent light guide 30. The module is variable in size, with the BLUs assembled together to meet requirements; thus, the module with the BLUs assembled together can provide high vacuum-occupied efficiency to be thin and the lightweight for success in the competitive market.

Figure 4:
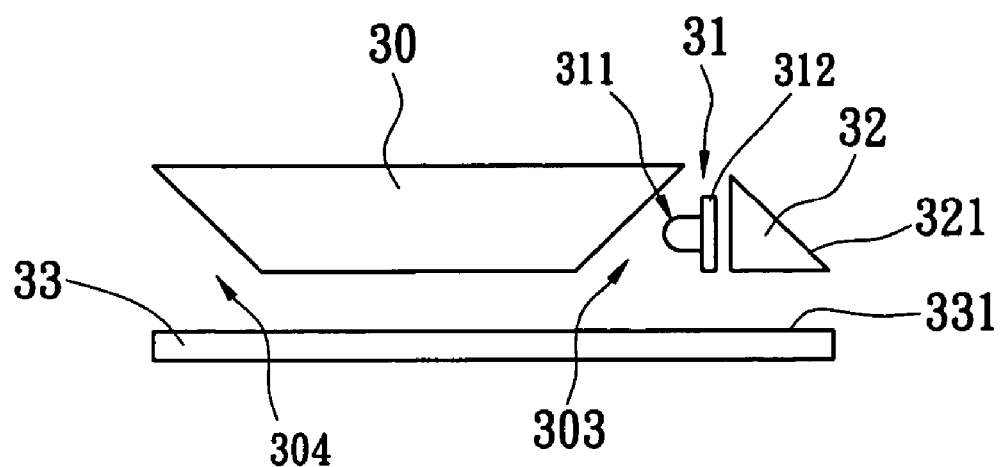
FIG. 4 is an enlarged side view of a preferred embodiment of a BLU according to the present invention.
Figure 5:
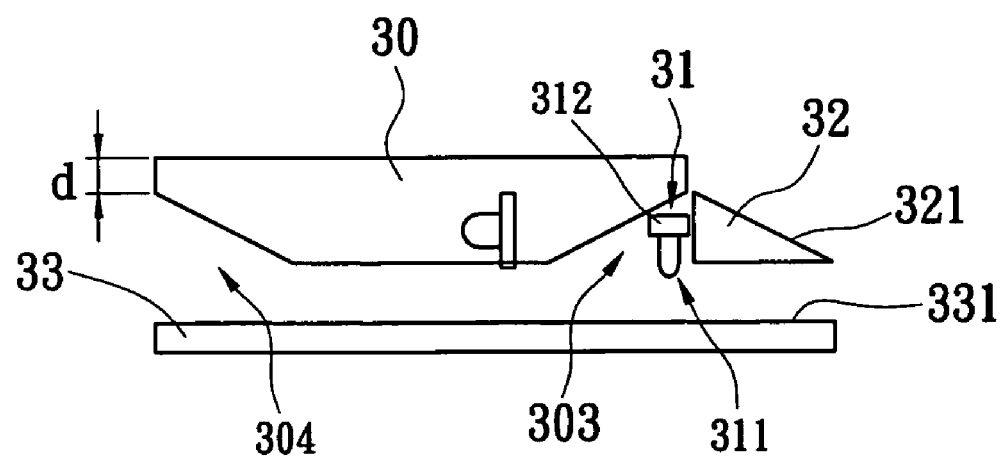
FIG. 5 is a an enlarged side view of another embodiment of a BLU according to the present invention.

With respect to FIGS. 4 and 5, the light source structure 31 is completely received in the first cavity 303; size and configuration of the heat conduction member 32 correspond to the second cavity 304 of the prior adjacent light guide 30 in the two adjacent BLUs of the module, and the heat conduction member 32 is received in the second cavity 304 of the prior adjacent light guide 30, completely. Therefore, the light-emitting surface 301 of the light guide 30 in the two adjacent BLUs of the module contacts tightly that of the prior adjacent light guide 30 to prevent the visible shape and configuration of the heat conduction member 32. Therefore, the light-emitting surface 301 of the light guide 30 connects to that of the prior adjacent light guide 30 so tightly that the heat conduction member 32 or the light source structure 31 will not be perceived from a top view. The module using a plurality of BLUs assembled together provides bright and uniform illumination. In another embodiment illustrated in FIG. 5, the light guide 30 has a predetermined thickness "d" spanning from the light-emitting surface 301 thereof downwardly; the light guide 30 can provide firm contact with the prior one in the two adjacent BLUs of the module via the predetermined thickness "d". Consequently, the module uses a variable quantity of BLUs assembled together to meet requirements, and to avoid costs of developing a large mold. Further, manufacturing conditions of a small-size BLU can be controlled more precisely than that of a large-size BLU, and the module using the plurality of the small-size BLUs assembled together accordingly provides an improved yield rate thereof.

Figure 6:
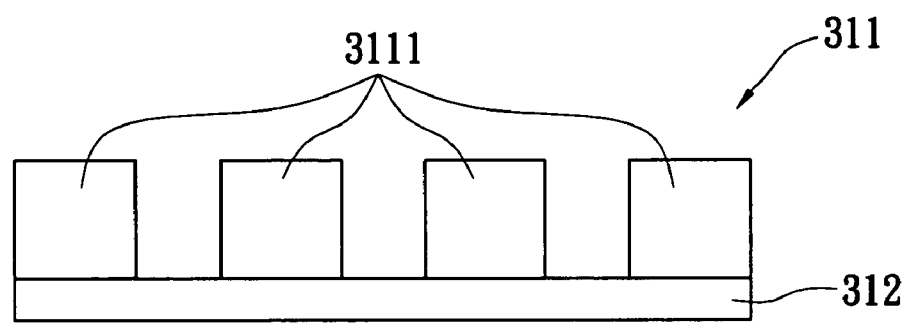
FIG. 6 is a perspective view of a preferred embodiment of a light source structure according to the present invention.
Figure 7:
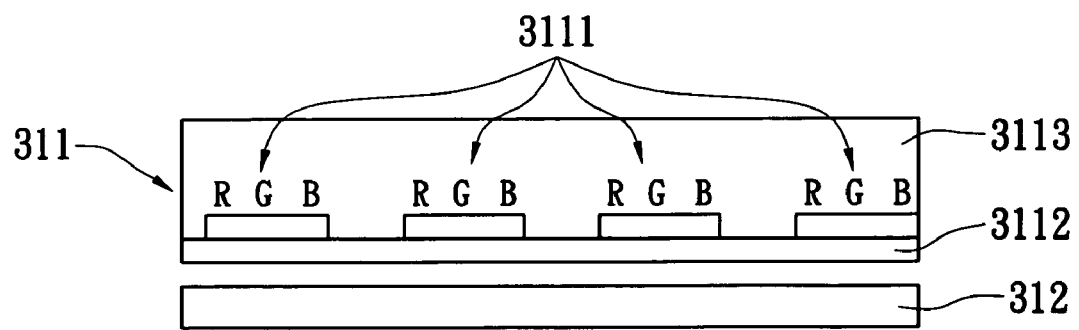
FIG. 7 is a perspective view of another embodiment of the light source structure according to the present invention.

For environmental requirements, the light source of a preferred embodiment according to the present invention provides at least one kind of LED, and particularly provides white LEDs in place of the CCFLs for illumination. There are six types of LED light source according to the present invention. A first type is a RGB LED, which includes a single-chip red, a single-chip green, and a single-chip blue housed together. A second type is a multi-chip that includes a red LED, a green LED and a blue LED mounted together. A third type of LED includes a dual-wavelength single-chip blue and a yellow-wavelength fluorescent material coating over the dual-wavelength single-chip blue. A fourth type of LED includes a single-chip blue and a fluorescent material of green and red wavelengths coating over the single-chip blue. A fifth type of LED includes a single-chip ultraviolet and a fluorescent material of visible light spectrum ranging from about 400 to 800 nm (nanometers) and coated over the single-chip ultraviolet. A sixth type of LED includes a single-chip ultraviolet and a fluorescent material of red, green and blue wavelengths coating over the single-chip ultraviolet. With respect to FIGS. 5 and 6, the light source structure 31 includes a printed circuit board 312, a control chip (not shown) assembled on the printed circuit board 312 and a light source 311 disposed on the printed circuit board 312. The printed circuit board 312 contacts the heat conduction member 32. In consequence, the light source 311 may include a plurality of white LEDs 3111, such as RGB LEDs. Each of the RGB LEDs includes a single-chip red, a single-chip green, and a single-chip blue housed together. Each of the RGB LEDs can be a single chip illustrated in FIG. 5. Alternatively, the light source 311 further includes a lead frame 3112 (in FIG. 6) on which the single-chip red, the single-chip green, and the single-chip blue are housed, and an encapsulant material 3113 covers the lead frame 3112 as a lighting module. The lead frame 3112 electrically connects to the printed circuit board 312. The printed circuit board 312 may further have a plurality of resistors (nor shown) to control and adjust the brightness of the light source 311. Optionally, the light source 311 may have a plurality of multi-chips illustrated in FIG. 6, and each of the multi-chips includes a red LED, a green LED and a blue LED mounted together for white light. The light source 311 may include a plurality of LEDs; each of the LEDs including a dual-wavelength single-chip blue and a yellow-wavelength fluorescent material (i.e., yellow YAG phosphors) coating over the dual-wavelength single-chip blue, which LED uses complementary mixing of blue and yellow emission to produce white output. The light source 311 may include a plurality of LEDs, with each of the LEDs including a single-chip blue and a fluorescent material of green and red wavelengths coating over the single-chip blue. The light source 311 may include a plurality of LEDs, in which each of the LEDs includes a single-chip ultraviolet and a fluorescent material of visible light spectrum ranging from about 400 to 800 nm (nanometers) and coated over the single-chip ultraviolet. The light source 311 may include a plurality of LEDs; each of the LEDs includes a single-chip ultraviolet and a fluorescent material of tri-wavelength (red, green and blue wavelengths phosphors) coating over the single-chip ultraviolet. The combination of the ultraviolet LED with red, blue and green phosphors generates white light owing to ultraviolet light exciting the phosphors to generate visible light. The LEDs mentioned above provide different characteristics. With the exception of the LED of the dual-wavelength single-chip blue and the yellow-wavelength fluorescent material that provide ultra brightness, the LEDs provides high color rendition. In compliance with various requirements, designs and manufacturing costs, the LEDs mentioned above can be assembled together to blend with each other for high and proper illumination as well as color rendition.

Illustrated in FIG. 4, each of the BLUs according to the present invention further includes a heat dissipation plate 33 contacting under the light guide 30. A preferred embodiment of the heat dissipation plate 33 has one-on-one size and configuration corresponding to the light guide 30 to contact the light guide 30 and the heat dissipation member 32 simultaneously. Another embodiment of the heat dissipation plate 33 is large and has a configuration corresponding to the plurality of the BLUs to contact quantities of the light guide 30 and the heat dissipation member 32 simultaneously. The heat dissipation plate 33 has a high thermal-conductivity coefficient for sinking heat from the heat dissipation members 32. The heat dissipation plate 33 is made of an aluminum alloy material or a copper alloy material. The module in this embodiment provides a high heat-dissipation efficiency to prevent heat problems from reducing serving life and light efficiency of the LEDs. The heat dissipation plate 33 has an upper surface 331 of high reflectivity, for collecting and reflecting the lights into the light guide 30 to raise the light efficiency. The upper surface 331 includes a silver coating, a high-reflectivity metallic coating, or a high-reflectivity dielectric coating. The heat conduction member 32 and the heat dissipation plate 33 are made integrally in one piece, or the heat conduction member 32 and the heat dissipation plate 33 connect to each other in a detachable manner. FIG. 4 shows the printed circuit board 312 parallel to and in contact with the heat conduction member 32 while the light source structure 31 provides light emission sideways. FIG. 5. shows the printed circuit board 312 perpendicular to and in contact with the heat conduction member 32 while the light source structure 31 provides light emission downwardly for reflection by the upper surface 331.

The prior adjacent light guide 30 in the two adjacent BLUs of the module has a prior heat conduction member 32 adjacent to the light guide 30 that is next to the prior adjacent light guide 30 in the two adjacent BLUs of the module; the prior heat conduction member 32 has a side surface 321 contacting the light guide 30 and has a high reflectivity. The side surface 321 includes a silver coating, a high-reflectivity metallic coating, or a high-reflectivity dielectric coating.

The present invention provides the BLUs and the module using the BLUs corresponding to a liquid crystal module 9 in an assemble manner, after the BLUs assembled, the module includes a diffusion sheet 34 arranged over the BLUs or the further includes a prism sheet 35 disposed over the diffusion sheet 34; the prism sheet 34 has a pattern processing with light convergence and uniformity.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A BLU and a module using the BLU for backlighting a display, the module comprising:
    a plurality of BLUs assembled together for collectively backlighting the display, wherein each of the BLUs comprises:
        a light guide, the light guide being wedge-like and having a light-emitting surface arranged on a top thereof and a bottom surface opposing the light-emitting surface, the light-emitting surface being larger than the bottom surface to define first and second cavity spaces on opposing sides of the bottom surface;
        a light source structure adjacent to a side of the light guide and received in the first cavity; and
        a heat conduction member contacting the light source structure, the heat conduction member being disposed at a side of the light source structure opposite the light guide;
    wherein the respective light guides in at least one adjacent pair of BLUs capture therebetween a light source and heat condition member pair, the captured heat conduction member extending into the second cavity space of one of the adjacent BLU light guides; and,
    wherein the light-emitting surfaces of the light guides in the adjacent BLUs contacts tightly;
    whereby the module is variable in size responsive to varying numbers of the BLUs being assembled together.

2. The BLU and a module using the BLU as claimed in claim 1, wherein the light source structure includes a printed circuit board, a control chip assembled on the printed circuit board and a light source disposed on the printed circuit board, wherein the printed circuit board contacts the heat conduction member.

3. The BLU and a module using the BLU as claimed in claim 2, wherein the light source includes a plurality of RGB LEDs, each of the RGB LEDs includes a single-chip red, a single-chip green, a single-chip blue housed together, the light source further includes a lead frame whereon the single-chip red, the single-chip green, the single-chip blue are housed, an encapsulant material covers over the lead frame, and the lead frame electrically connects to the printed circuit board.

4. The BLU and a module using the BLU as claimed in claim 2, wherein the light source has a plurality of multi-chips, and each of the multi-chips includes a red LED, a green LED and a blue LED mounted together.

5. The BLU and a module using the BLU as claimed in claim 2, wherein the light source includes a plurality of LEDs, and each of the LEDs includes a dual-wavelength single-chip blue and a yellow-wavelength fluorescent material coating over the dual-wavelength single-chip blue.

6. The BLU and a module using the BLU as claimed in claim 2, wherein the light source includes a plurality of LEDs, and each of the LEDs includes a single-chip blue and a fluorescent material of green and red wavelengths coating over the single-chip blue.

7. The BLU and a module using the BLU as claimed in claim 2, wherein the light source includes a plurality of LEDs, and each of the LEDs includes a single-chip ultraviolet and a fluorescent material of visible light spectrum ranging from about 400 to 800 nm (nanometers) and coating over the single-chip ultraviolet.

8. The BLU and a module using the BLU as claimed in claim 2, wherein the light source includes a plurality of LEDs, and each of the LEDs includes a single-chip ultraviolet and a fluorescent material of red, green and blue wavelengths coating over the single-chip ultraviolet.

9. The BLU and a module using the BLU as claimed in claim 1, further including a heat dissipation plate contacting and extending beneath the light guide and heat conductive member of each BLU, the heat dissipation plate having an upper surface of high reflectivity.

10. The BLU and a module using the BLU as claimed in claim 9, wherein the upper surface includes a silver coating, a high-reflectivity metallic coating, or a high-reflectivity dielectric coating.

11. The BLU and a module using the BLU as claimed in claim 9, wherein each heat conduction member and each heat dissipation plate has a high thermal-conductivity coefficient.

12. The BLU and a module using the BLU as claimed in claim 11, wherein each heat conduction member and each heat dissipation plate is made of an aluminum alloy material or a copper alloy material.

13. The BLU and a module using the BLU as claimed in claim 9, wherein the heat conduction member and the heat dissipation plate are made integrally in one piece, or the heat conduction member and the heat dissipation plate connect to each other in a detachable manner.

14. The BLU and a module using the BLU as claimed in claim 1, wherein a prior adjacent light guide in two adjacent BLUs of the module has a prior heat conduction member adjacent to a light guide next to the prior adjacent light guide in the two adjacent BLUs of the module, and the prior heat conduction member has a side surface contacting the light guide and has a high reflectivity.

15. The BLU and a module using the BLU as claimed in claim 14, wherein the side surface includes a silver coating, a high-reflectivity metallic coating, or a high-reflectivity dielectric coating.

16. The BLU and a module using the BLU as claimed in claim 1, wherein the module includes a diffusion sheet arranged over the BLUs.

17. The BLU and a module using the BLU as claimed in claim 16, wherein the module includes a prism sheet disposed over the diffusion sheet, the prism sheet having a pattern processing with light convergence and uniformity.

* * * * *